US006834679B2

(12) United States Patent
Briggs

(10) Patent No.: US 6,834,679 B2
(45) Date of Patent: Dec. 28, 2004

(54) TRANSFER LINE AND CLEANING METHOD FOR A TRANSFER LINE

(75) Inventor: Kevin Briggs, Blacksnape Darwen (GB)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/898,144

(22) Filed: Jul. 3, 2001

(65) Prior Publication Data

US 2002/0017313 A1 Feb. 14, 2002

(30) Foreign Application Priority Data

Jul. 7, 2000 (EP) .......................................... 00305790

(51) Int. Cl.[7] .......................................... A01G 25/09
(52) U.S. Cl. ............... 137/899.4; 137/343; 137/565.01; 137/572; 137/581; 137/899
(58) Field of Search ............................. 137/899.4, 899, 137/343, 565.01, 572, 581

(56) References Cited

U.S. PATENT DOCUMENTS

| | | | | |
|---|---|---|---|---|
| 2,643,732 A | * | 6/1953 | Keen | 15/321 |
| 3,385,265 A | * | 5/1968 | Schrader | 119/14.18 |
| 3,489,245 A | * | 1/1970 | Broadwell | 137/899 |
| 3,867,999 A | * | 2/1975 | Cox | 184/1.5 |
| 4,034,711 A | * | 7/1977 | Bender et al. | 119/14.11 |
| 4,723,971 A | * | 2/1988 | Caldas | 55/276 |
| 5,421,362 A | * | 6/1995 | Sordello | 137/351 |
| 5,885,364 A | | 3/1999 | Hieatt et al. | 134/22.11 |
| 6,006,777 A | * | 12/1999 | Renslow | 137/205 |

FOREIGN PATENT DOCUMENTS

| | | | |
|---|---|---|---|
| EP | 335 240 | 10/1989 | B08B/3/12 |
| EP | 985 633 | 3/2000 | B67C/3/26 |

OTHER PUBLICATIONS

Derwent Abstract 008021628 (1989), abstracting EP 335 240.

Derwent Abstract 013112331 (2000), abstracting EP 985 633.

International Preliminary Examination Report for International Application No. PCT/EP01/07303 dated Sep. 27, 2002.

* cited by examiner

*Primary Examiner*—A. Michael Chambers
(74) *Attorney, Agent, or Firm*—Michelle J. Burke; Lainie E. Parker; David H. Vickrey

(57) ABSTRACT

A transfer line for the transfer of fluid or powder-like substances from one or more sources to an outlet characterized in that the transfer line comprises at least one movable section, optionally including associated equipment such as one or more pumps or filters. The movable line section to be cleaned is coupled to a cleaning station. Water for a first washing is transferred through the movable line section and preferably at least for a part recirculated a number of times. The used water is drained off. Fresh water for a second washing is transferred through the movable line section. After transferring the used water from the second wash tank into the first wash tank, water from a third wash tank is transferred through the movable line section to the first wash tank. The washings collected in the first wash tank can be reused as a first washing for a next movable line section to be cleaned.

6 Claims, 2 Drawing Sheets

TRANSFER LINE AND CLEANING METHOD FOR A TRANSFER LINE

This application claims priority of European Patent Application No. 00305790.8, filed Jul. 7, 2000.

FIELD OF THE INVENTION

The invention relates to a transfer line for the transfer of fluid or powder-like substances from one or more sources to an outlet, such as a filling station, and to a cleaning method and a corresponding cleaning station.

BACKGROUND OF THE INVENTION

Transfer lines are used in a wide variety of industries. A point of concern is the ability to rapidly clean and change the use transfer lines to allow different products to be transferred to equipment for further processing or, e.g., to filling or packaging machinery.

The issue of cleaning transfer lines and ancillary equipment such as pumps or filters arises for instance with filling machines. Nearly every branch of industry that manufactures liquids, gels or granular products uses filling machines. For example, motor oils, pharmaceuticals, cooking oils, paints, adhesives, sauces, milk, and beer all require to be packed by filling machines into a variety of containers, including glass, metal, and plastics. All of these applications require rapid and complete cleaning of all pumps and pipelines to minimize lost production time.

The time taken to clean the transfer equipment between the packaging of two different products is an unproductive part of the process. In the foodstuffs industry, cleaning must be scrupulous to prevent cross-contamination of products. Insufficient attention to this factor would produce unpleasant taints and in particular, bacterial contamination. In the pharmaceutical industry, cross-contamination of medicines could have serious, even fatal, consequences. Even in the production of decorative paints and similar products, insufficient cleaning will create off-hues and streaks of colour. Incompatibility between synthetic resins may cause gelling or unacceptable rheological effects.

It is well known in the prior art that pipelines can be cleaned by driving a cleaning plug or "pig" from a launching station to a receiving station by water, air or the new product travelling through the line. In the last case the pig both cleans the line and separates the products. Pigs may be constructed from foamed or solid elastomeric material and shaped as balls, dumbbells, and mushrooms or as a series of discs. Despite the success of the pigging technique, switching the pipelines of the prior art to a new product without cross-contamination can take a considerable time because of the need to clean transfer pumps, filter units, and the like.

A typical water based paint factory will have several filling lines, packing paint into 1-liter, 2.5-liter, 5-liter, 10-liter, and 20-liter tinplate or plastic containers as required. For special purposes, including promotional offers, other volumes may be used. Hence, in a paint factory, the pipes from the tinting tanks to the filling machines have to be capable of transporting paint in various quantities appropriate to the volumes being packed. Also, various types of paint, described inter alia by such terms as "Matt", "Sheen", "Silk", "Eggshell", and "Gloss" cannot be intermixed even if the same colour. Ready-mixed colours and tint bases for in-store tinting are required. A range of whites, pale colours, and strong shades is made, together with tint bases. Because of the need to respond rapidly to customer demand and fashion, it is uneconomic to dedicate production lines to a single type of paint, one group of similar colours or even to a narrow range of pack sizes. This calls for transfer lines that are suitable for all products by being rapidly cleanable from end to end, including ancillary plant such as pumps and filters.

The object of the invention is a transfer line suitable for transferring various different products which can be cleaned thoroughly with a minimized loss of production time.

SUMMARY OF THE INVENTION

This object is achieved by a transfer line for the transfer of fluid or powder-like substances from one or more sources, e.g. a holding tank, to an outlet, such as a filling station, which has at least one movable section, optionally including associated equipment such as one or more pumps and/or filters. The movable section is releasably engageable with the other sections of the line. This object is also achieved by a method of cleaning a transfer line having at least one first movable section releasably engaged to other sections of the line. The first movable section(s) is released and cleaned while at least one second movable section is coupled to the transfer line to replace the first movable section(s).

DETAILED DESCRIPTION OF THE INVENTION

Figure 1:
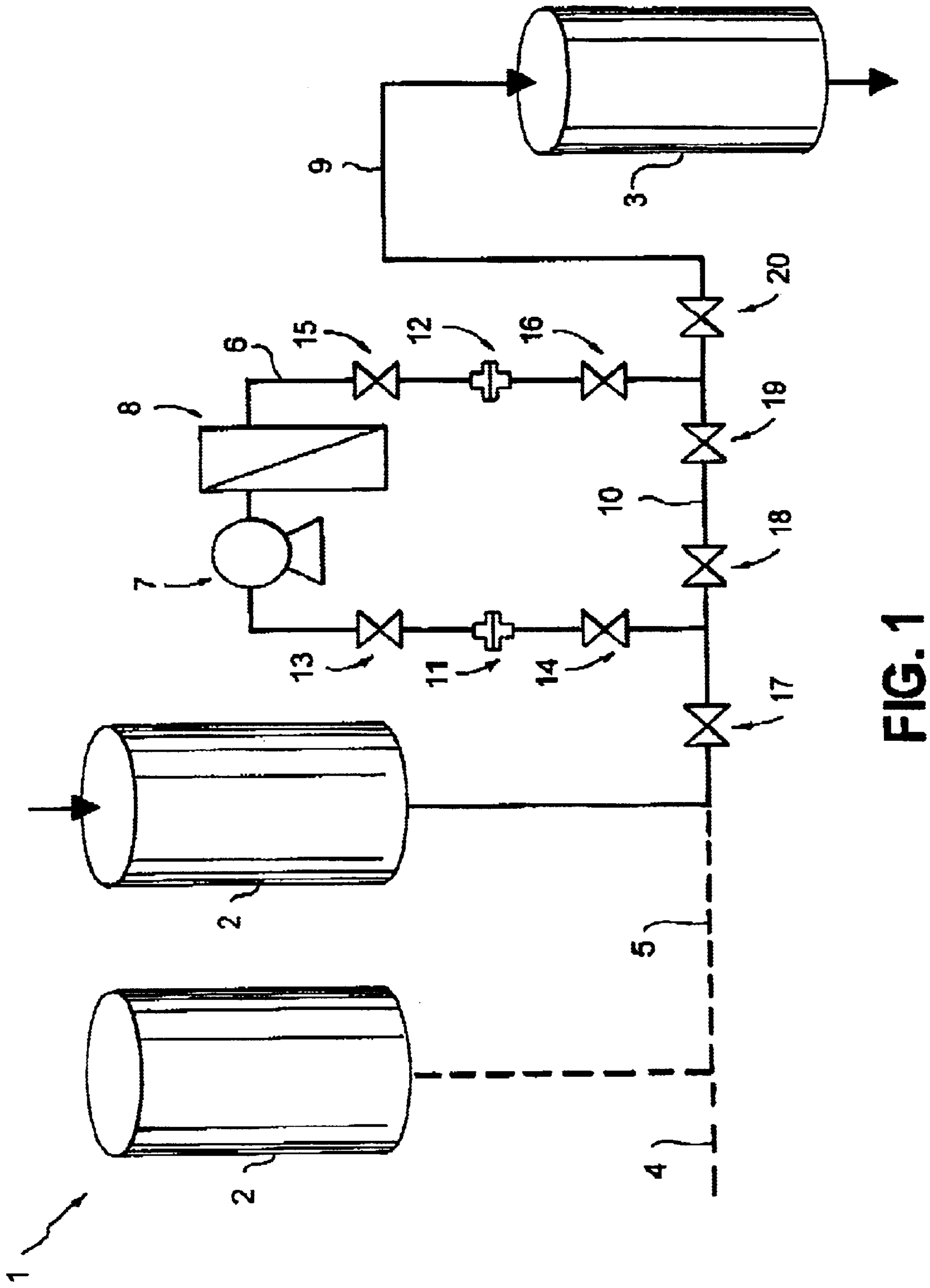
FIG. 1 is a schematic view of a machinery and a transfer line.

In the inventive transfer line, when changing from one product to be transferred through the transfer line to another, the movable section can easily be replaced with a clean interchangeable section of similar or different construction after the remaining part of the line has been cleaned, e.g., by flushing and/or pigging. The used section can be thoroughly cleaned while the transfer line is already in use for the new product. This way, loss of production time is minimized. For ease of handling, the movable sections are preferably carried on a trolley.

The invention also relates to a method for cleaning a transfer line for the transfer of fluid or powder-like substances, characterized in that:

- a line is used which comprises a first movable section optionally incorporating associated equipment, e.g. a pump, the section being releasably engageable with the other sections of the line;
- the first movable section is released and transported to a cleaning station;
- a second movable section is provided which is interchangeable with the first movable section;
- the second movable section is coupled to the main line.

To obtain improved cleaning results, the method preferably includes the following steps:

- the movable line section to be cleaned is coupled to a cleaning station;
- water, or another cleaning liquid, for a first washing is transferred through the movable line section and preferably at least for a part recirculated a number of times;
- the used water is drained off;
- fresh water, or another cleaning liquid, for a second washing is transferred through the movable line section and preferably at least for a part recirculated a number of times;

optionally, the used water or cleaning liquid for the second washing is transferred to a wash tank for use in a first washing of a next movable line section to be cleaned.

Such a method is preferably carried out using a cleaning station comprising at least two wash tanks. That way, the water or other cleaning liquid for the first washing can be supplied from the first wash tank while the water or other cleaning liquid for the second washing can be supplied from the second wash tank. The water originating from the second wash tank can be recycled to the first wash tank and can optionally be reused for a first wash of the next movable line section to be cleaned.

This reuse of washings can be further optimized in another preferred embodiment, using a cleaning station having at least three wash tanks, the volume of the first wash tank preferably being about the same as or larger than the accumulated total volume of the other wash tanks. After transferring the used water from the second wash tank, a connection is opened up between the movable line section and the third wash tank and water from the third wash tank is transferred through the movable line section to the first wash tank, optionally after a number of recirculations through the movable line section.

The invention further relates to a cleaning station for a movable line section of a transfer line as described above, the cleaning station comprising at least one water supply which is releasably connectable to one end of the portable line section via a valve and a washings transfer line.

In a preferred embodiment of the cleaning station, the water supply takes the form of a wash tank connected both to an outlet line releasably connectable to one end of the movable line section and to an inlet line releasably connectable to a return line from the other outer end of the portable line section. This allows recirculation of at least part of the washings and improves cleaning.

For easy draining off of the washings after completing the cleaning process, the wash tank preferably comprises a second outlet with a valve.

Multiple washing steps can be used, further improving the cleaning, if as preferred the cleaning station comprises a second wash tank having a first inlet connected via a valve to the return line, a second inlet connected via a valve to a water supply, and an outlet connected via a valve to the washings transfer line. After being washed with water from the first wash tank, the line section can be washed again in a further step, by opening and closing the right valves. After washing with water from the second wash tank, this water can be returned to the first wash tank, where it can be stored for a first washing of the next movable line section.

Preferably, the cleaning station comprises at least a third wash tank, having a first inlet connected via a valve to the return line, a second inlet connected via a valve to a water supply, and an outlet connected via a valve to the washings supply line, with the volume of the second and third and, optionally, further wash tanks adding up to at most the volume of the first wash tank. This way, all washings originating from the second, third, and, optionally, further wash tanks can be collected in the first wash tank and reused for a first washing of the next movable line section to be cleaned. The use of water needed for thorough cleaning can be minimized this way.

To reuse washings for, e.g., washing paint transfer lines, tanks have to be sterile to prevent bacterial or enzymic infection, leading to off odours, gas pressure build-up and loss of viscosity in paints, rendering them useless and causing a major problem of disposal. This process can be economically automated by the addition by dosing pump of part of the biocide which would be added to preserve the paint itself.

To understand and illustrate the advantages of the current invention, the use of supply lines from holding tanks to filling machines in the production of water based emulsion paints will be described in the following example. It is to be understood, however, that the invention is not limited in any way by the product being transferred or by whether the product contains water or solvent or is 100% pure liquid.

FIG. 1 shows a part of a machinery 1 comprising a set of holding tanks 2, a filling machine header station 3, and a transfer line 4 for transporting the contents of the holding tanks 2 to the filling machine header station 3. The holding tanks may be up to about 25000 liters in capacity, but may be even larger, or smaller, if so required. The transfer line 4 comprises a first upstream section 5 in which the contents of the holding tanks 2 are collected, a second section 6 incorporating a pump 7, in this particular example an air pump, and an optional filter 8, a third section 9 leading to the filling machine header station 3, and a bypass section 10 arranged parallel to the second section 6. The second line section 6 is coupled to the first upstream section 5 by means of a first flange joint 11. A second flange joint 12 couples the second line section 6 to the downstream third line section 9 leading to the filling machine header station 3. The flange joints 11, 12 are easily releasable. One end of the bypass section 10 is connected to the upstream line section 5, the other end being connected to the downstream line section 9. Valves 13, 14, 15, 16 are placed on both sides of the flange joints 11, 12. Further valves 17, 18, 19, 20 are placed on both sides of the connection of the bypass 10 with the upstream section 5 and the downstream section 9, respectively. These valves 17, 18, 19, 20 are full-bore valves capable of passing a cleaning pig without obstruction. As can be seen from FIG. 2, the second line section 6 is mounted on a portable trolley 21.

The filling machine is operated in the following way. Valves 13, 14, and 17 and 15, 16, and 20 are opened. Valves 18 and 19 are closed. A batch of liquid material is transferred from the holding tanks 2 via the second line section 6, the pump 7, and the filter 8 to the filling machine header station 3, where the liquid is dosed and filled into containers or other packaging material.

After supplying the batch to the filling machine header station 3, the filling machine is thoroughly cleaned so that it can be used for a new batch without contamination by residues of the previous batch. Cleaning takes place in the following way: Valves 13, 14, 15, 16 are closed. Valves 18 and 19 are opened. A hard rubber cleaning pig is launched from a launch station close to the tank, driven by water pressure. Close to the filling machine header station 3, the cleaning pig is intercepted by a pig receiver and relaunched back towards the tank using compressed air, sweeping the pig back to the original launch station and removing the contaminated water. Such pigging systems are known in the prior art and are not shown in the figure for reasons of clarity.

To clean the second line section 6, including the pump 7 and the filter 8, the air supply and flexible hose for the air pump, as well as the flange joints 11, 12 are uncoupled. The trolley 21 with the second line section 6, including the pump 7 and the filter 8, is taken away and replaced by a clean unit of similar construction.

Figure 2:
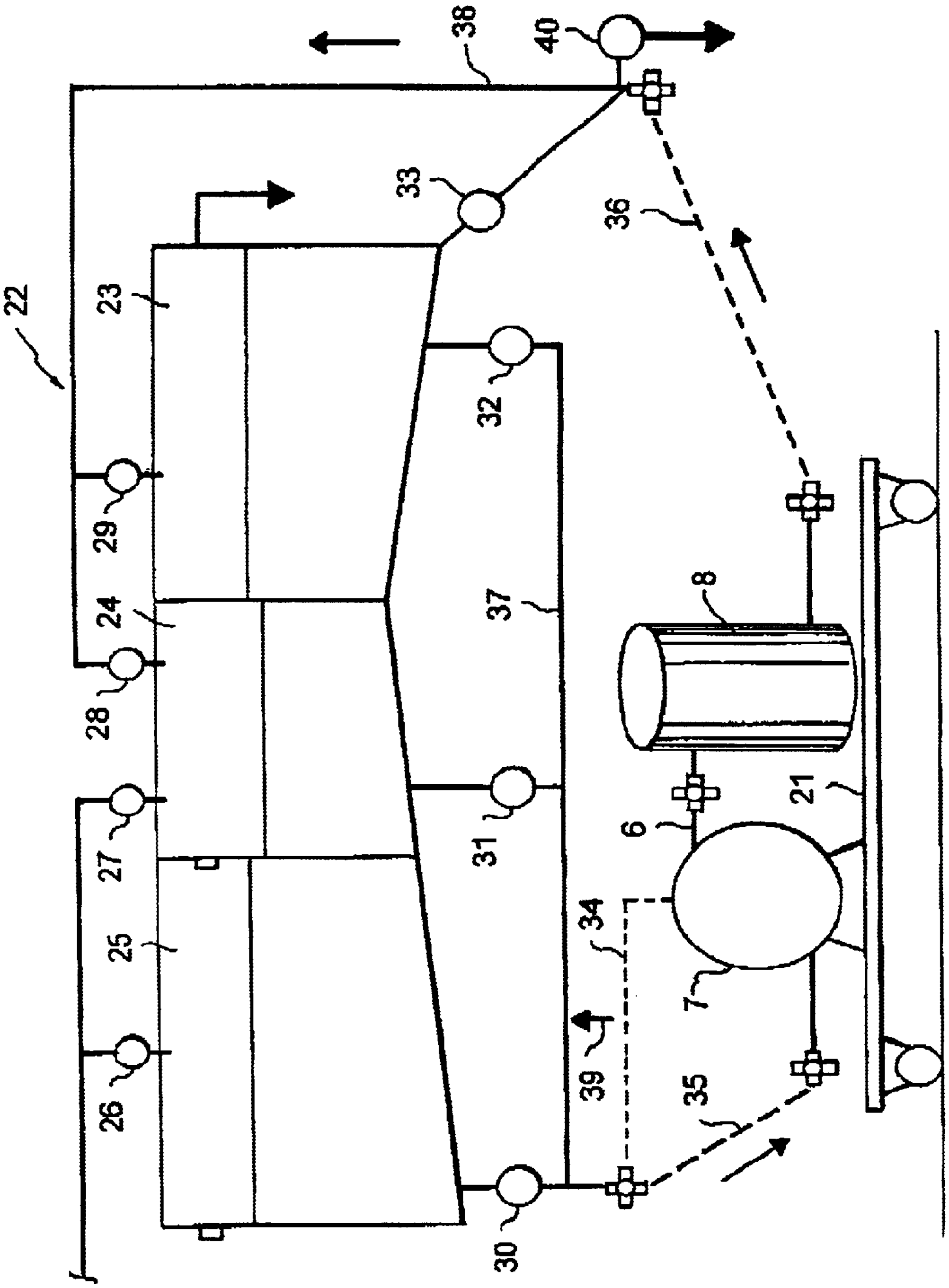
FIG. 2 is a schematic view of a portable transfer line section and wash tank assembly.

FIG. 2 shows a cleaning station 22 for cleaning the used second line section 6 with the pump 7 and the filter 8. The cleaning station 22 comprises a first wash tank 23, a second wash tank 24, and a third wash tank 25. The second and third wash tanks 24, 25 are of equal size and have about half the volume of the first wash tank 23. All wash tanks are provided with inlet valves 26, 27, 28, 29 and outlet valves 30, 31, 32, 33.

First, the pump 7 is connected to an air supply 34. Flexible hose 35, 36 are connected to the outer ends of the line section 6 by means of snap lock couplers (not shown). All the following procedures are controlled automatically, although manual override may be available, as required. Outlet valve 32 and inlet valve 29 of the first wash tank 23 are opened, all other valves remain closed. The pump 7 is started and pumps water or other cleaning medium from the first wash tank 23 via the valve 32, line 37, hose 35, filter 8, hose 36, line 38 and inlet valve 29 back into the first wash tank 23. After a while, a timer (not shown) times out and closes valve 32. When all the liquid in the pump 7, filter 8 and associated pipelines has been returned to the first wash tank 23, the pump 7 is stopped. An air bleed valve 39 assists in pumping out the last amount of liquid. Finally, valves 33 and 40 are now opened, allowing the contents of the first wash tank 23 to be drained off, for instance to a storage tank to be used as process water in a suitable subsequent batch of paint, or to an effluent treatment plant. All valves are now shut.

Second wash tank 24 has been pre-filled through valve 27 with clean water. A second round is now initiated by opening outlet valve 31 and inlet valve 28. The pump 7 again starts the circulation process. Again, after a number of circulations a timer times out, closes inlet valve 28, and opens inlet valve 29 of the first wash tank 23. As a result, all water is transferred from the second wash tank 24 to the first wash tank 23. Then another timer times out, shuts all valves and stops the pump 7.

The third wash tank 25 has been pre-filled with clean water through valve 26. A third round is initiated by opening outlet valve 30 of the third wash tank 25 and inlet valve 29 of the first wash tank 23. All other valves remain closed. The pump 7 is started up and the contents of the third wash tank 25 are pumped to first wash tank 23. Again, the pump 7 stops when a timer times out.

At this moment, the second and third wash tanks 24, 25 are empty, whereas the first wash tank 23 is now filled with used washings originating from wash tanks 24 and 25. Optionally, a second round of washing can be initiated by refilling the second and third wash tanks 24, 25 with fresh water, and emptying the first wash tank 23. After rinsing the movable line section again with water from the second and third wash tanks 24, 25, the used water is stored in the first wash tank 23 for use as the first wash for a next movable line section to be cleaned.

During the cleaning process, the filter 8 can optionally be reversed to keep the filter mesh and basket clean of oversized particles.

Tests were carried out with a filling machine and a cleaning station as shown in the figures. Comparative tests were carried out with a prior art filling machine having substantially the same arrangement as the machine in FIG. 1, except that the pump and the filter were not placed on a removable trolley and the flanges 11, 12 and valves 13 and 15 were left out. Further, the pump used in the prior art arrangement was a peristaltic pump.

EXAMPLE 1

A batch of high-quality brilliant white matt emulsion paint was transferred from the holding tanks to 5-liter containers. The pump used in this particular example was an air operated double diaphragm pump. After filling of the containers, the transfer line of the machinery 1 was cleaned in the above-described way.

Changing the used line section and pump/filter assembly took about five minutes, after which the whole was immediately available for supplying paint of a different type to the filling machine. The total amount of water used for the cleaning of the transfer line and associated equipment was only 200 liters.

COMPARATIVE EXAMPLE I

A batch of high-quality brilliant white matt emulsion paint was transferred from the holding tanks to 5-liter containers. The peristaltic pump was gravity fed with paint from the tank and transferred it, via a filter, through a pipeline to supply a filling machine header tank. A supply valve controlled the pumping and this process took about 90 minutes.

Before filling of the next batch of paint, which was a low cost white emulsion paint, the pipelines and pump/filter assemblies were cleaned. This was done by closing the line section including the pump/filter assembly by means of valves. A hard rubber pig was launched from a launch station close to the tank, driven by water pressure. This driving water also assisted in cleaning the pipe. When the pig arrived close to the filling machine header tank, it was intercepted by a pig receiver and relaunched back towards the tank using compressed air. This swept the pig back to the original launch station, removing the water which was contaminated with white paint from the pipeline.

The line section comprising the pump/filter assembly was cleaned by opening all valves in it and by closing the valves in the adjacent parts of the upstream and downstream line sections and subsequently supplying water or another cleaning liquid, partly recirculating it and partly letting it flow through.

This continued for 20 minutes, until the water which ran out was substantially free of paint. The total amount of water used was 625 liters, in contrast to the 200 liters needed in the above described example according to the invention. The water was contaminated with diluted paint and drained into a sump, from where it was pumped to holding tanks for treatment to precipitate the suspended paint solids, prior to discharge into a drain for further treatment.

EXAMPLE 2

A 9,000-liter batch of a mid-shade colour called Bahamas Blue was filled into 2.5-liter containers by a filling machine as used in Example 1. The total filling time was 150 minutes. The machine was cleaned as described above in relation to FIG. 2. The time needed to change the used portable line section, including the pump and the filter, was about one minute, after which the machine could be used again for the next batch. Meanwhile, the used pump/filter unit was washed in the above-described way in about 25–30 minutes. The total volume of water used in the washing station to restore the pump/filter unit to a clean condition for the next batch of paint was 200 liters.

COMPARATIVE EXAMPLE II

Comparative example I was repeated with a batch of 9,000 liters of the same paint as in Example 2. The cleaning process for the pump/filter assembly took 4 hours and used 5000 liters of water.

EXAMPLE 3

Example 1 was repeated with a terracotta paint product classified as a “deep shade”. Again, only 1 minute was required to change the removable line section with the pump/filter assembly. In this case, the total volume of water used to wash the portable unit was 200 liters.

Terracotta or other deep shades, such as black or Etruscan, hitherto could not be filled using prior art filling machinery as described above, as they were considered to be too difficult to clean off. For these shades, a manual portable filling line was used with great inefficiency. It is estimated that 10,000 liters of water would be needed to clean such a unit.

What is claimed is:

1. A transfer line for the transfer of fluid or powder-like substances from one or more sources to an outlet, the transfer line comprising:

at least one nonmoveable section;

at least one movable section, the movable section being releasably enageable with the nonmoveable section of the line;

at least one replacement moveable section, the replacement moveable section being interchangeable with the moveable section;

wherein only one of said movable section or replacement moveable section may be engaged with the nonmoveable section at a single point in time.

2. The transfer line of claim 1 wherein both the moveable section and the replacement moveable section comprise pumps or filters or combinations thereof.

3. A transfer line for the transfer of fluid or powder-like substances from one or more sources to an outlet, the transfer line comprising:

at least one nonmovable section;

at least one moveable section, the movable section being releasably engageable with the nonmoveable section;

at least one bypass section for bypassing the moveable section, the bypass section being engaged to the nonmoveable sections;

at least one first set of valves for closing off the moveable section from the nonmoveable sections; and at least one second set of valves for closing off the bypass section from the nonmoveable sections.

4. The transfer line of claim 3 wherein the moveable section is carried on a trolley.

5. The transfer line of claim 3 wherein the by-pass section is located parallel to the moveable section.

6. The transfer line of claim 3 wherein the movable section comprises pumps or filters or combinations thereof.

* * * * *